June 4, 1929.                R. W. BROWN                1,715,988
ABSOLUTE PRESSURE GAUGE
Filed July 10, 1925

INVENTOR.
ROY W. BROWN
BY
ATTORNEY.

Patented June 4, 1929.

1,715,988

UNITED STATES PATENT OFFICE.

ROY W. BROWN, OF AKRON, OHIO, ASSIGNOR TO THE FIRESTONE TIRE AND RUBBER COMPANY, OF AKRON, OHIO, A CORPORATION OF OHIO.

ABSOLUTE-PRESSURE GAUGE.

Application filed July 10, 1925. Serial No. 42,730.

This invention relates to pressure gauges and particularly to a self-compensating pressure gauge for accurately and directly indicating absolute pressures and particularly indicating the low pressures of partial vacuums.

One object of the invention is to provide an apparatus for quickly, accurately and directly indicating absolute pressure.

Another object is to provide an improved pressure indicating gauge which is arranged to float on the surface of the liquid of a barometer which is subjected to the pressure to be ascertained and to move in relation to a column of said liquid in the barometer tube in accordance with the change in level of the body of said liquid occasioned by flow of the liquid to and from the tube.

Another object is to provide means for accurately guiding movement of the floating gauge vertically with respect to the tube.

Another object is to provide in a gauge of the kind described above, means for eliminating inaccuracies in readings due to parallax.

The foregoing and ancillary objects are obtained by the construction illustrated in the accompanying drawing and described in detail below. It is to be understood that the invention is not limited to the specific construction shown and described.

Of the accompanying drawings.

Figure 1:
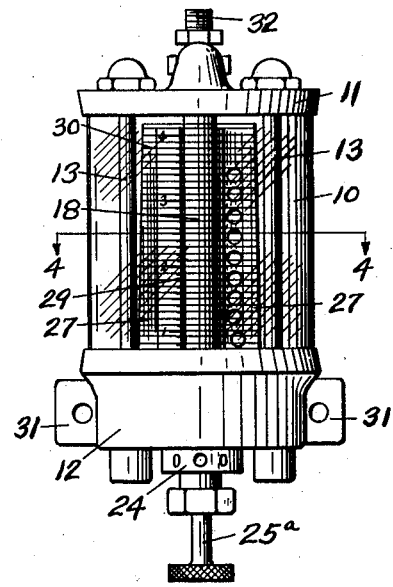
Figure 1 is a front elevation of a pressure gauge embodying the invention.
Figure 2:
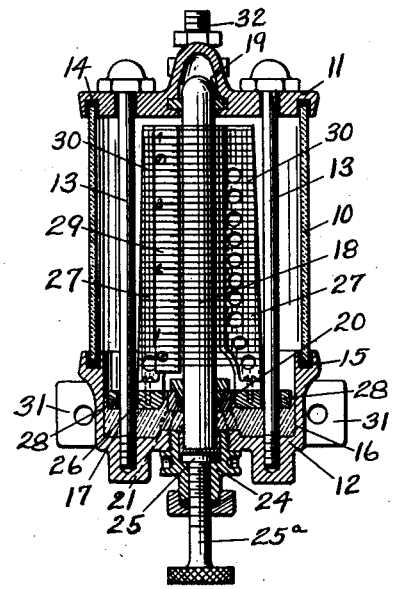
Figure 2 is a vertical diametral section therethrough on line 2—2 of Figure 3.
Figure 3:
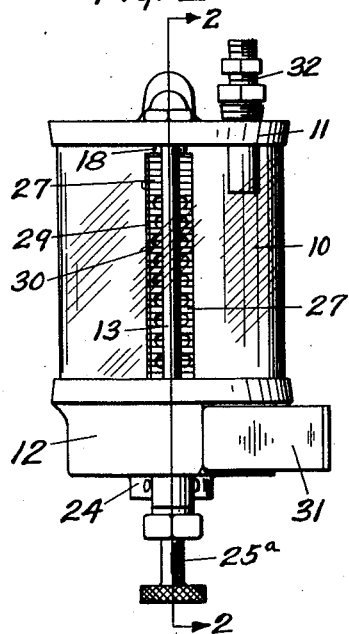
Figure 3 is a side elevation thereof.

Referring to the drawings, 10 represents a transparent cylinder of glass having a top 11 seated thereon and resting on a bottom 12, the top 11, cylinder 10, and bottom 12 being secured together by cap screws 13, 13 extending through cylinder 10, a chamber being thus formed in cylinder 10 which is rendered air-tight by packing as at 14 and 15 between the top 11 and cylinder 10 and between the bottom 12 and cylinder 10.

Bottom 12 is formed with a cavity at 16 for the reception of the body of a barometer fluid such as mercury indicated at 17. Arranged to project downwardly into said fluid is a barometer tube 18 open at its lower end and supported vertically in the chamber by aligned bearings 19 and 20, the former in the top 11 and the latter supported by a spider 21 on bottom 12. The lower end of tube 18 is formed with a capillary tube 22 extending downwardly therein and formed so as to provide an air-trap pocket 23. Threaded into the bottom 12 below tube 18 is a supporting plug 24 for a closure member 25 movable into engagement with the lower end of tube 18 by being carried on an adjustable screw 25ª.

Figure 4:
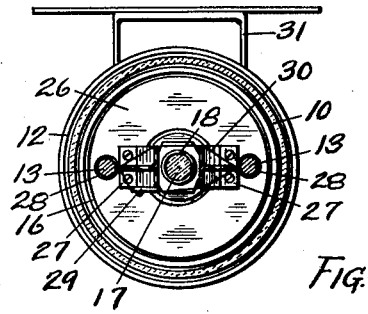
Figure 4 is a section on line 4—4 of Figure 1.
Figure 5:
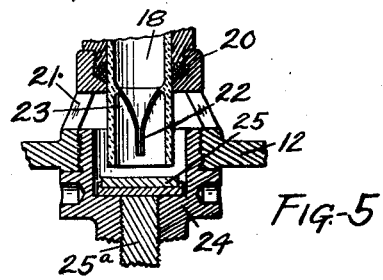
Figure 5 is a detail section.

Arranged on the mercury 17 is an annular disk 26 of suitable material lighter than mercury and on disk 26 is mounted two comparatively light standards 27, 27 on diametrically opposite sides of tube 18. Disk 26 has apertures 28, 28 therein through which screws 13 extend, the latter serving as guides for vertical movement of disk 26. At least one of standards 27 carries a scale 29 in inches above the level of the mercury on which disk 26 is floating. As best shown in Figure 4, fine wires 30, 30 are so wrapped around standards 27 in coincidence with the scale divisions and in vertical parallelism that a sight wire will be in front of and in back of the barometer tube 18 for each scale division.

If desired, the gauge may be supported in vertical position on a suitable panel (not shown) by brackets 31, 31 on bottom 12. To connect the interior of the gauge to the system in which the absolute pressure is to be ascertained, a connecting nipple 32 extending downwardly through top 11 is provided.

In use, tube 18 is normally completely full of mercury 17 and disk 26 is floating on the surface thereof in cavity 16. The system in which the pressure is to be measured is now connected to nipple 32. This will cause the pressure, if it be less than atmospheric pressure, to fall on the surface of mercury 17 in cavity 16 and will cause the column of mercury in tube 18 to descend until its weight balances the pressure on the surface of mercury 17. Flow of mercury from tube 18 into cavity 16 will cause float 26 to rise and thus automatically adjust the scale 29 to the proper level. The height of the column in tube 18 may now be read on scale 29 by sighting with the wires 30 as will be understood.

It will be seen from the foregoing that a direct reading gauge has been provided for indicating accurately the degree of vacuum in any system. This obviates the indirect method of reading an ordinary vacuum gauge and an ordinary barometer and computing the absolute pressure from such readings.

Modifications of the invention may be resorted to without departing from the spirit thereof or the scope of the appended claims.

What is claimed is:

1. An absolute pressure gauge comprising, an air-tight transparent vessel, a liquid barometer in said vessel, a float on the surface of the barometric liquid, a scale carried by the float parallel to the barometric tube for measuring the column of barometric liquid therein, said scale including standards on opposite sides of the barometer tube, and means for connecting said vessel to a system in which the pressure is to be ascertained.

2. An absolute pressure gauge comprising, an air-tight transparent vessel, a liquid barometer in said vessel, a float on the surface of the barometric liquid, a scale carried by the float parallel to the barometric tube for measuring the column of barometric liquid therein, said scale including a pair of standards on opposite sides of the barometric tube and fine wires wrapped about the standards so as to pass in front and in back of said tube, and means for connecting said vessel to a system in which the pressure is to be ascertained.

3. An absolute pressure gauge comprising, a transparent vessel, posts extending through the vessel, a barometric tube in the vessel between the posts, a cavity at the bottom of the vessel containing barometric liquid, a float on the surface of the liquid guided by the posts and a scale carried by the float so as to measure the column of barometric liquid in the tube above the surface of the liquid in the cavity.

4. A pressure gauge having in combination an air-tight vessel, a barometer tube mounted in the vessel, a valve for closing the end of said barometer tube, and means for connecting the vessel to a system in which the pressure is to be measured.

ROY W. BROWN.